(12) United States Patent
Miyashita (10) Patent No.: US 7,039,217 B2
(45) Date of Patent: May 2, 2006

(54) APPARATUS AND METHOD FOR DETECTING ADAPTIVE MOTION DIRECTION

(75) Inventor: Masanobu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 10/027,007

(22) Filed: Dec. 26, 2001

(65) Prior Publication Data

US 2002/0118863 A1  Aug. 29, 2002

(30) Foreign Application Priority Data

Dec. 27, 2000   (JP)   ............................ 2000-396550

(51) Int. Cl.
*G06K 9/00* (2006.01)
(52) U.S. Cl. .................................................. 382/107
(58) Field of Classification Search ................. 382/107
See application file for complete search history.

(56) References Cited

U.S. PATENT DOCUMENTS

| 4,616,931 A | * | 10/1986 | Studer ......................... 356/28 |
| 5,832,101 A | * | 11/1998 | Hwang et al. ............... 382/107 |
| 5,929,913 A | * | 7/1999 | Etoh ...................... 375/240.11 |
| 6,081,606 A | * | 6/2000 | Hansen et al. .............. 382/107 |
| 6,122,320 A | * | 9/2000 | Bellifemine et al. ........ 375/240 |
| 6,160,901 A | * | 12/2000 | Kage .......................... 382/107 |
| 6,345,106 B1 | * | 2/2002 | Borer .......................... 382/107 |
| 6,668,070 B1 | * | 12/2003 | Kondo et al. ............... 382/107 |

FOREIGN PATENT DOCUMENTS

| JP | 6-96210 | 4/1994 |
| JP | 7-192135 | 7/1995 |
| JP | 8-44852 | 2/1996 |

OTHER PUBLICATIONS

Russ, John C., The Image Processing Handbook, 1995, CRC Press, Inc., Second Edition, pp. 155-157.*

* cited by examiner

*Primary Examiner*—Jingge Wu
*Assistant Examiner*—Anthony Mackowey
(74) *Attorney, Agent, or Firm*—Dickstein, Shapiro, Morin & Oshinsky, LLP.

(57) ABSTRACT

In an adaptive motion direction detecting apparatus, an image input unit inputs two-dimensional pixel data of an object. A response output unit includes a plurality of response element arrays each having different time phases, and each of the response element arrays includes a plurality of response elements. Each of the response elements generates a response output for one of a plurality of local areas partly superposed thereon, and the two-dimensional pixel data is divided into the local areas. A correlation function calculating unit calculates spatial and time correlation functions between the response outputs of the response elements. A response output selecting unit selects response outputs of the response output unit for each of the local areas in accordance with the spatial and time correlation functions. A motion direction detecting unit includes a plurality of detection elements each corresponding to the response elements. Each of the detection elements detects a motion direction of the object at one of the local areas in accordance with selected response outputs therefor.

2 Claims, 8 Drawing Sheets

| i | j | m | n |
|---|---|---|---|
| 1 | 1 | 1 | 1 |
| 1 | 2 | 2 | 1 |

APPARATUS AND METHOD FOR DETECTING ADAPTIVE MOTION DIRECTION

BACKGROUND OF THE INVENTION

1. Field of the Invention

The present invention relates to an apparatus and method for detecting an adaptive motion direction of an image (object).

2. Description of the Related Art

In a first prior art adaptive motion direction detecting method, the following steps are carried out:

1) first two-dimensional pixel data of an object from a pickup camera for preset areas at time t1 is fetched and stored in a first frame memory;

2) second two-dimensional pixel data of the object from the pickup camera for the preset areas at time t2 (>t1) is fetched and stored in a second frame memory;

3) differences between the first and second two-dimensional pixel data stored in the first and second frame memories are calculated; and 4) an image of the object at time t3 (>t2) is estimated to detect a motion direction of the contour of the object.

The above-described first prior art adaptive motion direction detecting method is disclosed in JP-A-6-96210 and JP-8-44852.

In the first prior art adaptive motion direction detecting method, however, since the image of the object has a bright contour and a dark contour which are generally different from each other, the calculated differences between the first and second two-dimensional pixel data depend upon the deviation between the bright contour and the dark contour, so that it is difficult to accurately determine the motion direction of the object.

In the above-described first prior art adaptive motion direction detecting method, in order to accurately determine the motion direction of an object independent of a bright contour and a dark contour thereof, two-dimensional pixel data in each of the present areas are normalized by their maximum lightness and their minimum lightness to form bright contour data and the dark contour data. Then, motion directions of the object are determined in accordance with the bright contour data and the dark contour data, respectively. On the other hand, two-dimensional pixel data in each of the preset areas is caused to be binary data "1" when the lightness thereof is larger than a definite lightness, and two-dimensional pixel data in each of the preset areas is caused to be binary data "0" when the lightness thereof is not larger than the definite lightness. However, these techniques deteriorate the efficiency of motion detection. In addition, the presence of the two frame memories does not save the resource of memories.

A second prior art adaptive motion direction detecting method, spatial and time convoluting integrations are performed upon N-successive images for each local area at times t, t+Δt, t+2Δt, . . . , t+NΔt, to obtain an optical flow, thus detecting a speed of an object (see: JP-A-7-192135).

In the above-described second prior art adaptive motion direction detecting method, however, since means for determining all gradients of the object are required, the resource thereof cannot be saved. That is, images statistically include horizontal displacement; even in this case, spatial and time convoluting interactions for all the directions have to be carried out, which decreases the efficiency of the resource thereof.

SUMMARY OF THE INVENTION

It is an object of the present invention to provide an apparatus and method for detecting an adaptive motion direction capable of enhancing the resource efficiency and saving the resource of memories.

According to the present invention, in an adaptive motion direction detecting apparatus, an image input unit inputs two-dimensional pixel data of an object. A response output unit includes a plurality of response element arrays each having difference time phases, and each of the response element arrays includes a plurality of response elements. Each of the response elements generates a response output for one of a plurality of local areas partly superposed thereto. In this case, the two-dimensional pixel data is divided into the local areas. A correlation function calculating unit calculates spatial and time correlation functions between the response outputs of the response elements. A response output selecting unit for selects response outputs of the response output unit for each of the local areas in accordance with the spatial and time correlation functions. A motion direction detecting unit includes a plurality of detection elements each corresponding to the response elements. Each of the detection elements detects a motion direction of the object at one of the local areas in accordance with selected response outputs therefor.

Also, in an adaptive motion direction detecting method, two-dimensional pixel data of an object is inputted. Then, a response output is generated for one of a plurality of local areas partly superposed thereon. In this case, the two-dimensional pixel data is divided into the local areas. Then, spatial and time correlation functions between the response outputs are calculated. Then, response outputs are selected for each of the local areas in accordance with the spatial and time correlation functions. Finally, a motion direction of the object at one of the local areas is detected in accordance with selected response outputs for the one of the local areas.

BRIEF DESCRIPTION OF THE DRAWINGS

The present invention wilt be more clearly understood from the description set forth below, with reference to the accompanying drawings, wherein.

DESCRIPTION OF THE PREFERRED EMBODIMENT

Figure 1:
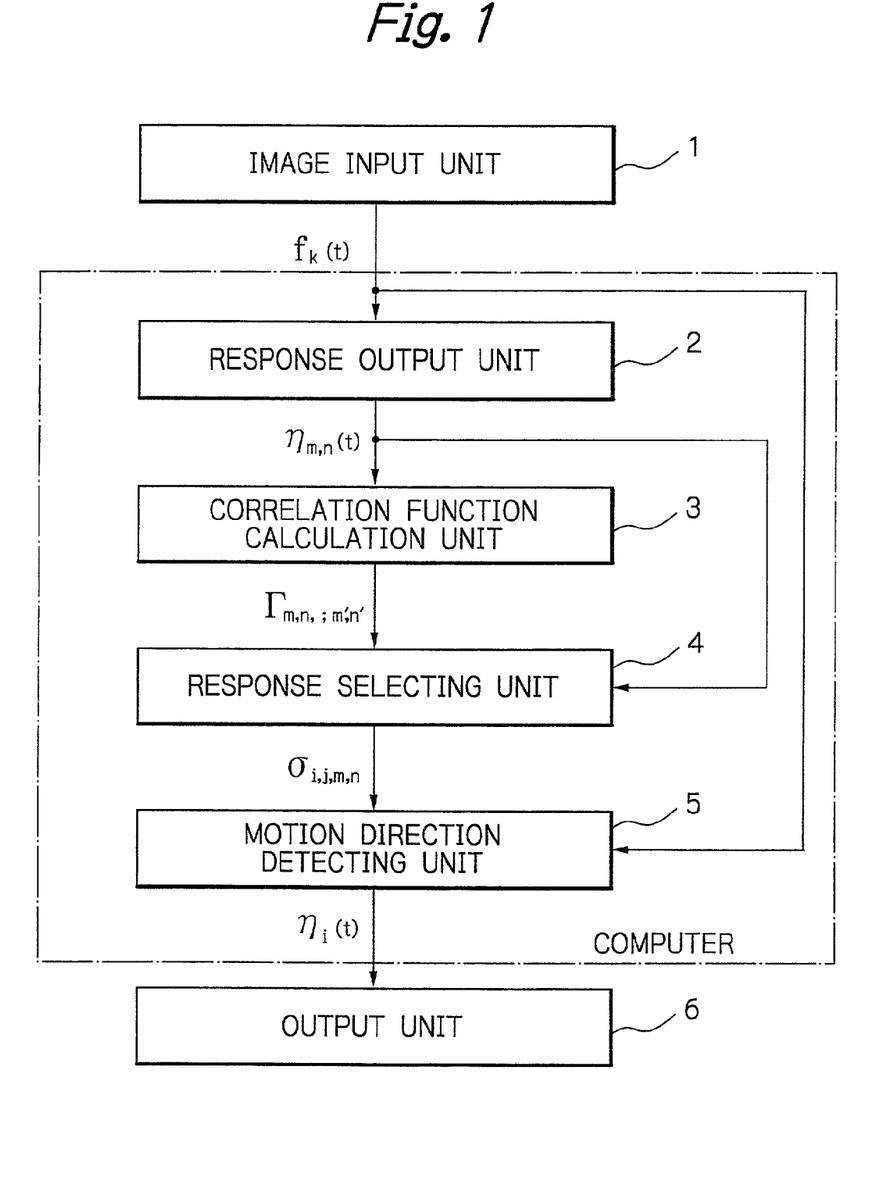
FIG. 1 is a block circuit diagram illustrating an embodiment of the adaptive motion direction detecting apparatus according to the present invention.

In FIG. 1, which illustrates an embodiment of the adaptive motion direction detecting apparatus according to the present invention, an image input unit 1, a response output unit 2, a correlation function calculating unit 3, a response selecting unit 4, a motion direction detecting unit 5, and an output unit 6 are provided. In this case, the response output unit 2, the correlation function calculating unit 3 and the response selecting unit 4 are constructed by a computer including a central processing unit (CPU), memories and the like.

Figure 2:
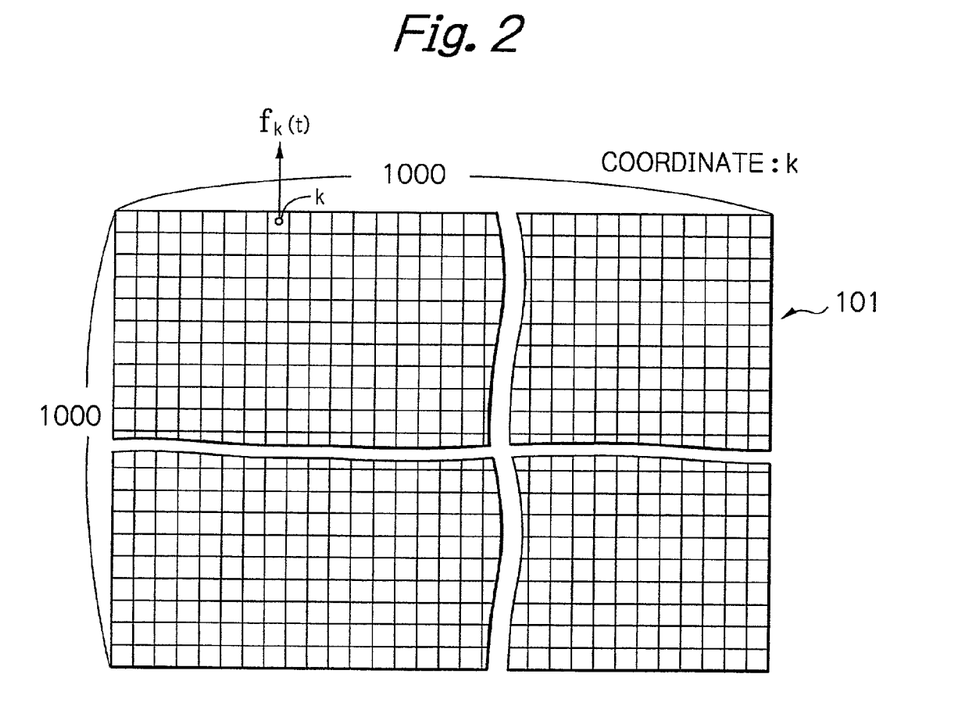
FIG. 2 is a diagram of pixel data inputted by the image input unit 1 of FIG. 1.

The image input unit 1 is constructed by a charge coupled device (CCD) camera, for example, which inputs two-dimensional pixel data 101 such as 1000×1000 pixel data having coordinate k (k=1 to 1000000) as shown in FIG. 2. In this case, pixel data of coordinate k at time t is represented by $f_k(t)$.

Figure 3:
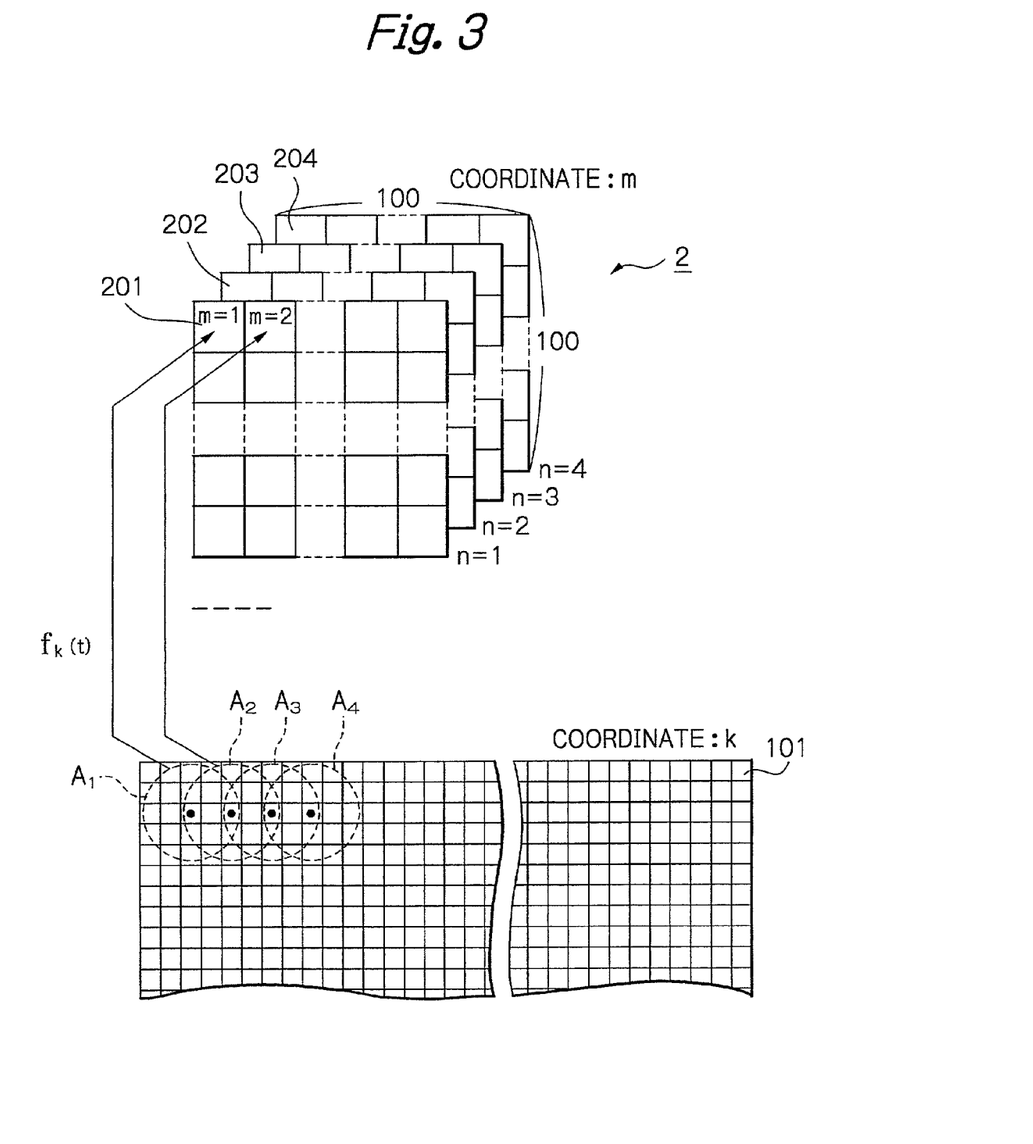
FIG. 3 is a diagram of the response output unit of FIG. 1.

The response output unit 2 is constructed by two-dimensional response element arrays 201, 202, 203 and 204 each having 100×100 response elements as shown in FIG. 3. In this case, each of the response elements has coordinate m (m=1 to 10000). Also, each of the response element arrays 201, 202, 203 and 204 has coordinate n (n=1 to 4).

That is, the two-dimensional data area of the pixel data is divided into local areas $A_1, A_2, \ldots, A_m, \ldots, A_{10000}$, which are partly superposed on each other. Then, each of the response elements m (m=1, 2, . . . , 10000) receives pixel data $f_k(t)$ of the local area $A_m$. Note that the local areas $A_1, A_2, \ldots, A_m, \ldots, A_{10000}$ are realized by performing a Gaussian function upon the pixel data $f_k(t)$.

The coordinate n corresponds to a response phase. In this case, the difference in phase between the coordinate n is 90°.

A response function $R_{m,k,n}(t)$ of the response element defined by coordinate m and coordinate n is represented by:

$$R_{m,k,n}(t) = S_{m,k} \cdot T_n(t) \quad (1)$$

where $S_{m,k}$ is a spatial response function; and
$T_n(t)$ is a time response function.

Also, the spatial response function $S_{m,k}$ is represented by:

$$S_{m,k} = 1/(2\pi\lambda_{ex}^2) \cdot \exp(-d_{m,k}^2/(2\lambda_{ex}^2)) - \kappa/(2\pi\lambda_{inh}^2) \cdot \exp(-d_{m,k}^2/(2\lambda_{inh}^2)) \quad (2)$$

where $\lambda_{ex}$ and $\lambda_{inh}$ are coefficients for showing spatial spread of the pixel data for one response element ($\lambda_{ex} < \lambda_{inh}$, for example, $\lambda_{ex} : \lambda_{inh} = 0.25:1$);
k is a constant between 0 and 1; and
$d_{m,k}$ is a distance between the coordinate m and the coordinate k.

Note that the coordinate m is defined by a center of the local area $A_m$ of the coordinate k (see: dots of the pixel data 101 of FIG. 3). Therefore, the distance $d_{m,k}$ is represented by:

$$d_{m,k}^2 = (x_m - x_k)^2 + (y_m - y_k)^2 \quad (3)$$

where $x_m$ and $y_m$ are an X-direction value and a Y-direction value, respectively, of the coordinate m; and
$x_k$ and $y_k$ are an X-direction value and a Y-direction value, respectively, of the coordinate k.

The time response function $T_n(t)$ is represented by:

$$T_1(t) = \exp(-t/\lambda_t) \cdot \sin(\omega t) \cdot \Theta[t(T_0 - t)] \quad (4)$$

$$T_2(t) = -\exp(-(T_0 + \tau_0 - t)/\lambda_t) \cdot \sin[\omega(t - \tau_0)] \cdot \Theta[(t - \tau_0)(T_0 + \tau_0 - t)] \quad (5)$$

$$T_3(t) = -T_1(t) \quad (6)$$

$$T_4(t) = -T_2(t) \quad (7)$$

where $\lambda_t$ is a coefficient for showing a spread of time response;
$T_0$ is a period of the time response;
$\tau_0$ is a delay time;

$\omega$ is an angular frequency ($=2\pi/T_0$); and
$\Theta$ is a step function.

The response element at coordinate m and coordinate n generates the following response output $\eta_{m,n}(t)$:

$$\eta_{m,n}(t) = \int_{-\infty}^{t} dt' \sum R_{m,k,n}(t') \cdot f_k(t-t') \quad (8)$$

The correlation function calculating unit 3 calculates a correlation function $\Gamma_{m,n;m',n'}$ between the response output $\eta_{m,n}(t)$ of a response element having coordinate m and coordinate n and the response output $\eta_{m',n'}(t)$ of a response element having coordinate m' and coordinate n' by:

$$\Gamma_{m,n;m',n'} = <\eta_{m,n}(t) \cdot \eta_{m',n'}(t)>_t \quad (9)$$
$$= \int_0^{T_0} dt \, \eta_{m,n}(t) \cdot \eta_{m',n'}(t)$$

where $< >_t$ means an average value with respect to time.

The response selecting unit 4 selects response outputs having high spatial and time correlations from the response outputs $\eta_{m,n}(t)$ of the response output unit 2 in accordance with the correlation functions $\Gamma_{m,n;m',n'}$ calculated by the correlation function calculating unit 3. Also, the motion direction detecting unit 5 detects a motion direction of an image in accordance with the output of the response selecting unit 4.

Figure 4:
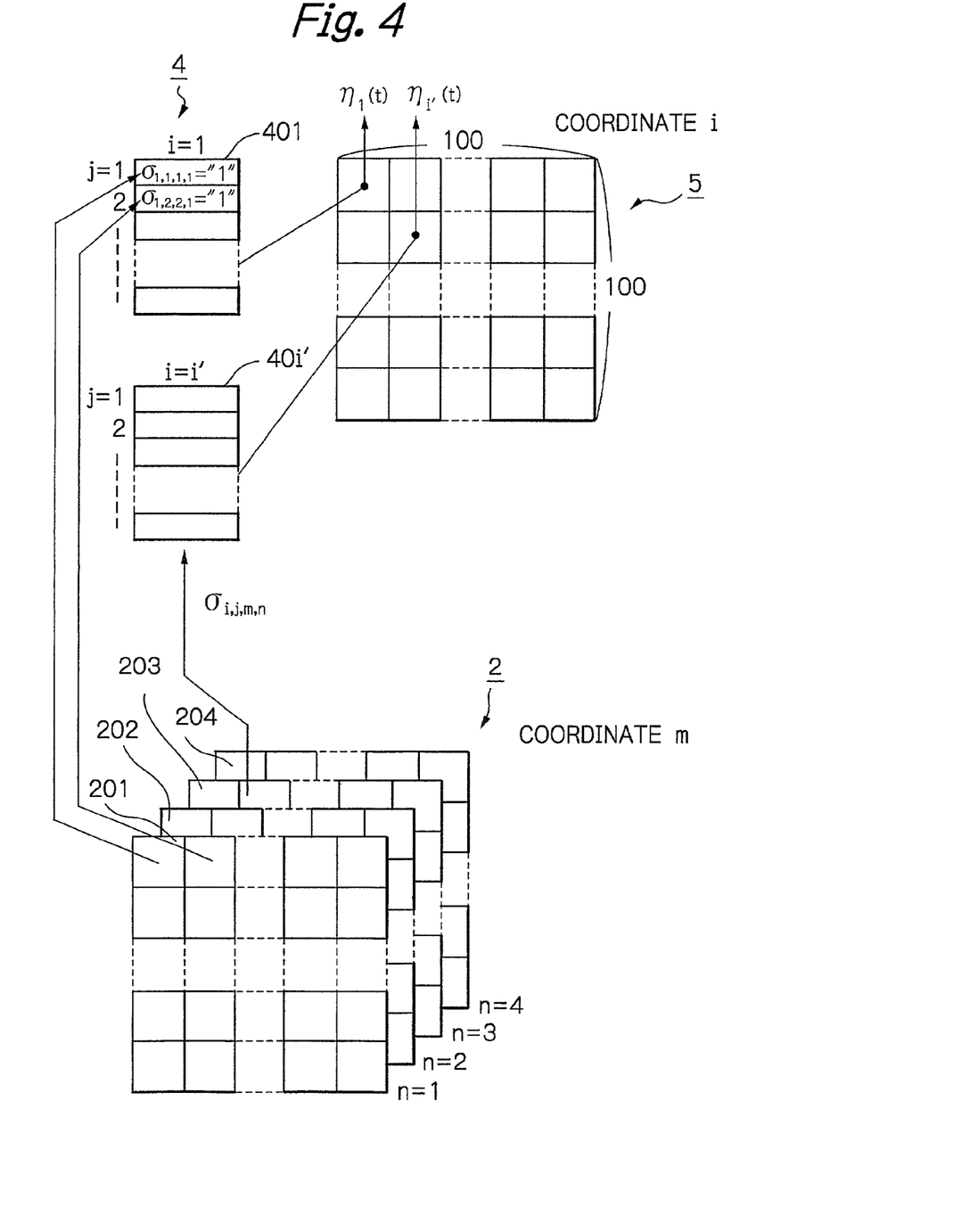
FIG. 4 is a diagram of the response selecting unit and the motion direction detecting unit of FIG. 1.

As illustrated in FIG. 4, the motion direction detecting unit 5 is constructed by a two-dimensional detection element array having 100×100 detection elements having coordinate i. Also, the response selecting unit 4 is constructed by tables 401, . . . , 40i', . . . for storing $\sigma_{i,j,m,n}$ corresponding to the detection elements of coordinate i (i=1 to 10000).

The response selecting unit 4 is operated so that the following cost function E is minimum:

$$E = \sum_{i,i'} V_{i,i'} E_{i'} \quad (10)$$

$$E_{i'} = -\sum_{j,m,n} \sum_{j',m',n'} \sigma_{i,j,m,n} \cdot \sigma_{i',j',m',n'} \Gamma_{m,n;m',n'} V_{i,i'} \quad (11)$$

$$= 1/(2\pi\lambda_1^2) \cdot \exp(-d_{i,i'}^2/(2\lambda_1^2)) - \quad (12)$$
$$1/(2\pi\lambda_2^2) \cdot \exp(-d_{i,i'}^2/(2\lambda_2^2))$$

where $\lambda_1$ and $\lambda_2$ are coefficients ($\lambda_{ex} < \lambda_{inh}$, for example, $\lambda_{ex} : \lambda_{inh} = 0.25:1$); and
$d_{i,i'}$ is a distance between the coordinate i and the coordinate i'.

Note that the coordinates i and i' are defined by a center of the local area of the coordinates i and i', respectively. Therefore, the distance $d_{i,i'}$ is represented by:

$$d_{i,i'}^2 = (x_i - x_{i'})^2 + (y_i - y_{i'})^2 \quad (13)$$

where $x_i$ and $y_i$ are an X-direction value and a Y-direction value, respectively, of the coordinate i; and
$x_{i'}$ and $y_{i'}$ are an X-direction value and a Y-direction value, respectively, of the coordinate i'.

Also, the output $\eta_i(t)$ of the detection element of coordinate i is represented by:

$$\eta_i(t) = \sum_k R_{i,k}(t) \cdot f_k(t) \quad (14)$$

$$R_{i,k}(t) = \sum_{j,m,n} \sigma_{i,j,m,n} \cdot R_{m,k,n}(t) \quad (15)$$

Note that, only when the response output $\eta_{m,n}(t)$ from the response output unit 2 is received by the response selecting unit 4, is $\sigma_{i,j,m,n}$ "1". Otherwise, $\sigma_{i,j,m,n}$ is "0".

Here, consider that $f_k(t)$ is a grating pattern or a sinusoidal wave-shaped gray pattern given by:

$$f_k(t|\theta, f_s, f_t) = \cos[2\pi f_s(x_k \cos\theta + y_k \sin\theta) - 2\pi f_t \cdot t] \quad (16)$$

where $\theta$ is a gradient of the grating pattern corresponding to an angle of a motion direction of an object;
$f_s$ is a space frequency of the grating pattern; and
$f_t$ is a time frequency of the grating pattern. In this case, the formula (14) is replaced by:

$$\eta_i(t|\theta, f_s, f_t) = \int_{-\infty}^{t} dt' \sum_k R_{i,k}(t') \cdot f_k(t' - t|\theta, f_s, f_t) \quad (17)$$

In the formula (17), the value of $\theta$ gives a direction selectivity of the detection element of coordinate i when $\eta_i(t|\theta, f_s, f_t)$ is maximum. In other words, if $\theta$ does not show the direction selectivity of the detection element of coordinate i, $\eta_i(t|\theta, f_s, f_t)$ is very small and can be negligible. Thus, if pixel data $f_k(t)$ is given, the motion direction of an image included in the pixel data $f_k(t)$ can be detected by the output $\eta_i(t|\theta, f_s, f_t)$ of the detection elements having coordinate i.

The operation of the adaptive motion direction detecting apparatus of FIG. 1 is explained simply below.

First, the image input unit 1 receives pixel data 101 as shown in FIG. 2. In this case, each of pixel data 101 is a gray signal.

The response output unit 2 divides two-dimensional data area of the pixel data into a plurality of local areas $A_1$, $A_2$, ..., $A_k$, ... as shown in FIG. 3. Then, the response output unit 2 generates the response output $\eta_{m,n}(t)$ for each of the local areas $A_1$, $A_2$, ..., $A_k$, ....

The correlation function calculating unit 3 calculates spatial and time correlation functions $\Gamma_{m,n;m',n'}$ between the response outputs of the response output unit 2.

The response selecting unit 4 selects response outputs $\eta_{m,n}(t)$ of the response outputs unit 2 in accordance with the spatial and time correlation function $\Gamma_{m,n;m',n'}$.

The motion direction detecting unit 5 detects a motion direction in accordance with the selection result, $\sigma_{i,j,m,n}$ of the response selecting unit 4 and the response output $\eta_{m,n}(t)$ of the response output unit 2.

Figure 5A:
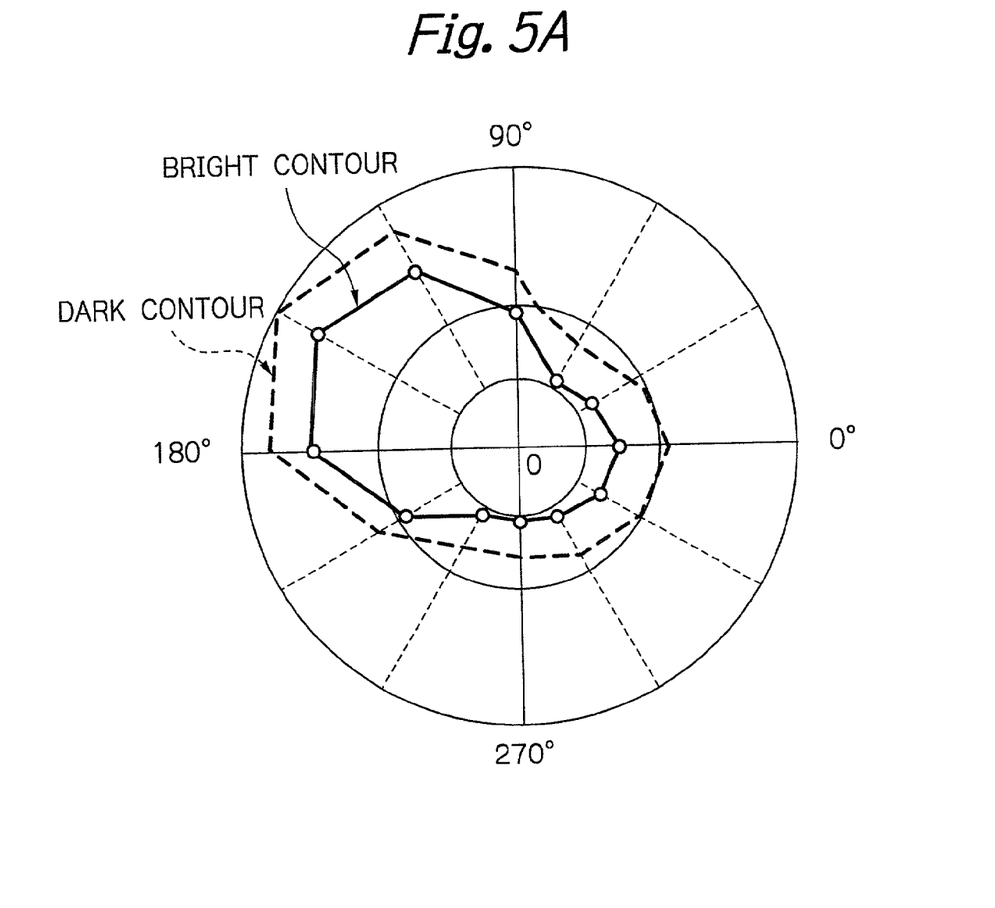
FIG. 5A is a diagram illustrating an example of the output of one detection element of FIG. 4.
Figure 5B:
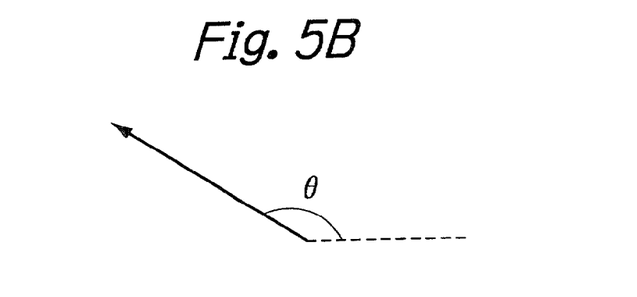
FIG. 5B is a diagram of an arrow showing the gradient of the output of the detection element of FIG. 5A.

In FIG. 5A, which shows an example of the output $\eta_i(t)$ of one detection element of coordinate i of FIG. 4, depicted on the output unit 6, a solid line shows a bright contour of an object, while a dotted line shows a dark contour of the object. In this case, the bright contour and the dark contour are both moving along the same direction of a gradient $\theta$ as indicated by FIG. 5B.

Figure 6:
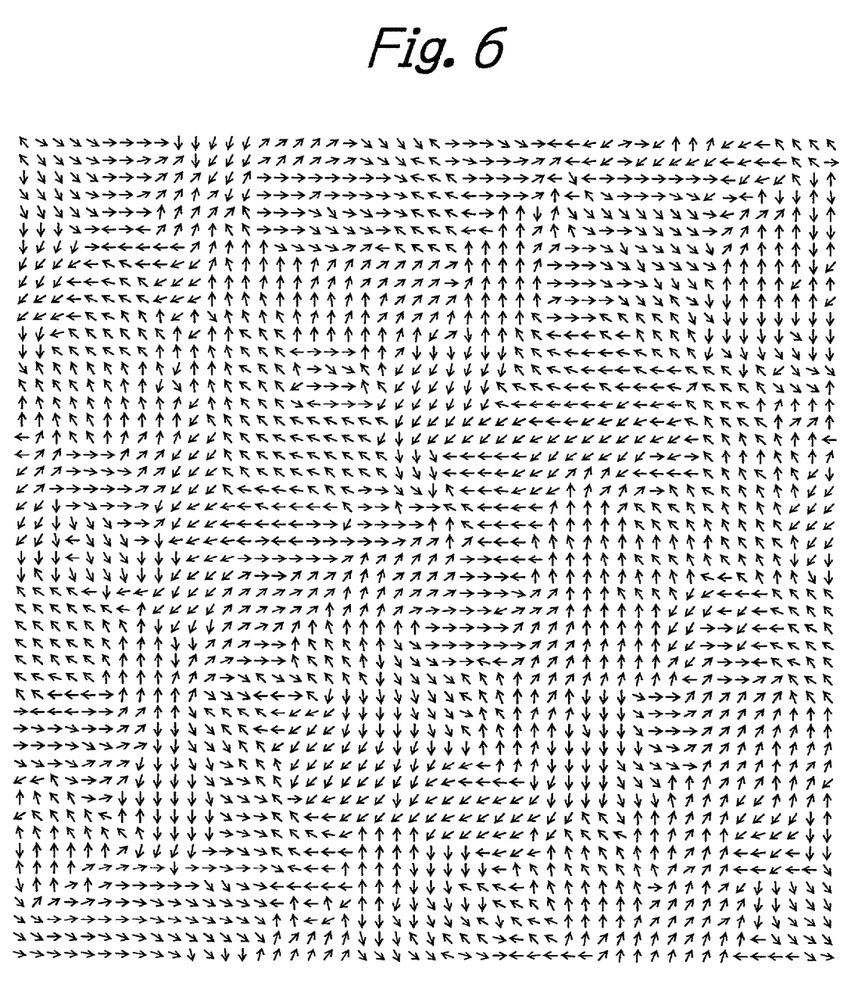
FIGS. 6 and 7 are diagrams of arrows showing examples of the gradients of the outputs of all the detection elements of FIG. 4.
Figure 7:
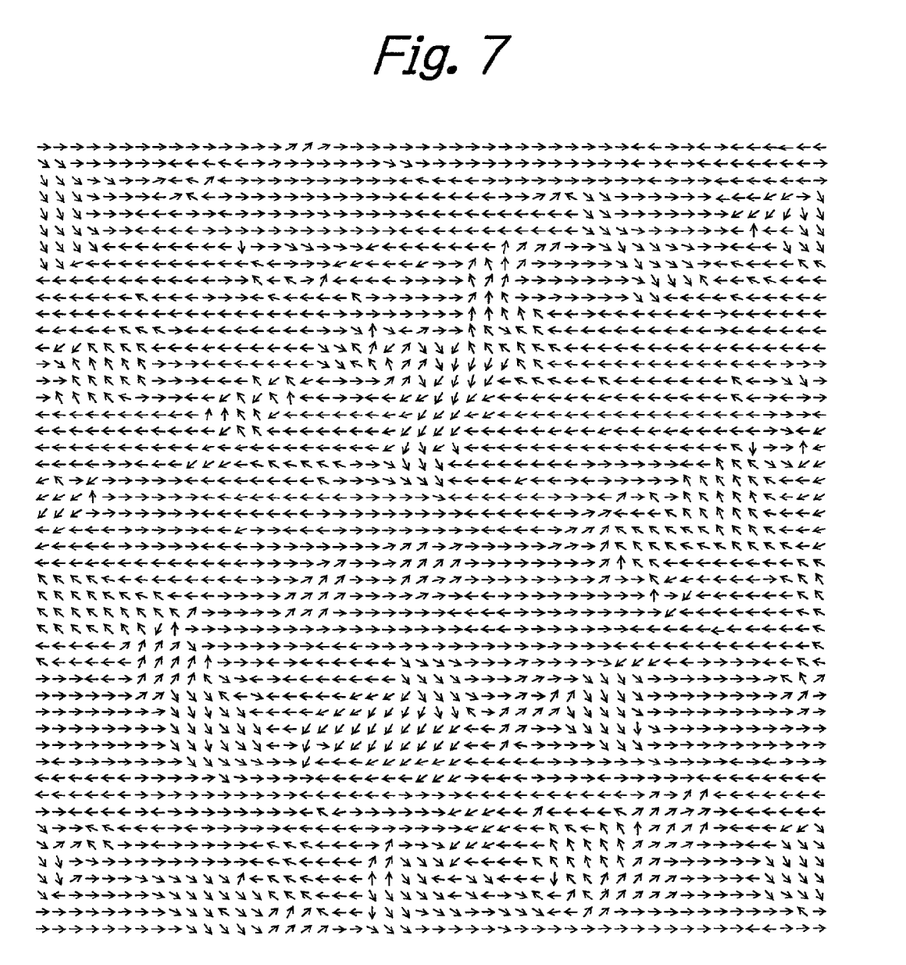

FIGS. 6 and 7 are diagrams showing examples of arrows of the gradients of the outputs of all the detection elements of FIG. 4 where the number of detection elements is 50×50. Particularly, FIG. 7 shows a case where an object is moving around 0° and 180°.

Figure 8:
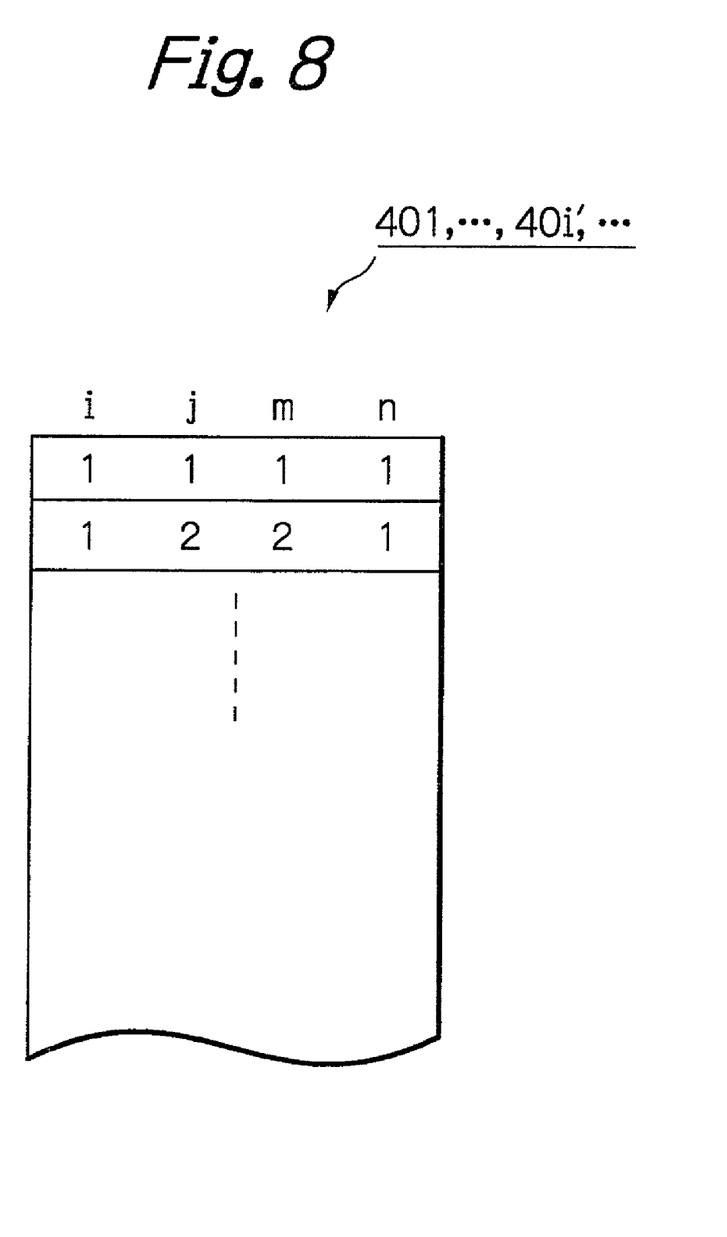
FIG. 8 is a diagram of a memory into which the tables of FIG. 4 are combined.

In the above-described embodiments, when an object (image) is moving, the number of $\sigma_{i,j,m,n}$ (="1") selected by the response selecting unit 4 is increased. On the other hand, when an object (image) is not moving, the number of $\sigma_{i,j,m,n}$ (="1") selected by the response selecting unit 4 is decreased. Note that the tables 401, ..., 40i', ... of FIG. 4 are used for storing $\sigma_{i,j,m,n}$ regardless of its value "1" or "0"; however, the tables 401, ..., 40i', ... can be combined into a memory as shown in FIG. 8 which stores only coordinates i, j, m and n of $\sigma_{i,j,m,n}$ whose value is "1". The memory of FIG. 8 can be reduced in size as compared with all of the tables 401, ..., 40i, ... of FIG. 4, which is helpful in saving the resource of memories.

In the above-described embodiment, when the response element arrays 201, 202, 203 and 204 are constructed so as to have a response time phase of 90°, the detection elements of the motion direction detecting unit 5 are operated in accordance with the response outputs of the response element arrays 201, 202, 203 and 204 to obtain a motion direction angle from 0° to 360° as shown in FIG. 5A. This has been mathematically proved by the formulae (1) to (7).

Also, in the above-described embodiment, since one two-dimensional pixel data area is divided into partly-superposed local areas $A_1, A_2, \ldots, A_m, \ldots$ as shown in FIG. 3, the response output of the response elements of one local area includes a part of the response output of the response element of its adjacent local areas, which is helpful in enhancing the detection accuracy of motion directions.

In the prior art adaptive motion direction apparatus where two frame memories are used for storing image data at different timings, the frame memories require a capacity of 1000×1000×2 bits (=2,000,000 bits). On the other hand, in the above-described embodiment, 1000×1000×1 bits (image input unit),
100×100×4 bits (response elements),
100×100×1 bits (detection elements), and
100×100×20 bits (memory of FIG. 8) are required, i.e., only 1,250,000 bits are required. Thus, a remarkable reduction of memories can be expected.

Also, since it is unnecessary to compare two kinds of image data to detect a motion direction of an object (image), the efficiency of detection of a motion direction can be enhanced.

As explained herein above, according to the present invention, a motion direction of an object (image) can be detected independent of the object whose contour being bright or dark. Also, the detection resource efficiency of an accurate motion direction can be enhanced. Further, the detected motion direction of an object is statistically reflected by the motion of an input image of the object. Additionally, the resource of memories can be saved.

The invention claimed is:

1. An adaptive motion direction detecting apparatus comprising:
   an image input unit for inputting two-dimensional pixel data of an object having coordinate k;
   a response output unit including response elements having coordinate m and coordinate n, said coordinate m corresponding to one of a plurality of a local areas partly superposed thereon, into which said two-dimensional pixel data are divided, each of said response elements generating a response output $\eta_{m,n}(t)$ depending on a spatial response function $S_{m,k}$ and a time response function $T_n(t)$, said spatial response function being a Gaussian function centered at said coordinate m;

a correlation function calculating unit for calculating spatial and time correlation functions $\Gamma_{m,n;m',n'}$ between the response outputs $\eta_{m,n}(t)$ and $\eta_{m',n'}(t)$;

a response output selecting unit for selecting response outputs of said response output unit in accordance with a said spatial and time correlation functions $\Gamma_{m,n;m',n'}$; and a motion direction detecting unit including detection elements having coordinate i corresponding to coordinate m, each of said detection elements detecting a motion direction of said object at coordinate i in accordance with selected output response output for said coordinate i.

2. An adaptive motion direction detecting method comprising the steps of:

inputting two-dimensional pixel data of an object having coordinate k;

dividing said two-dimensional data into a plurality of local areas partly superposed thereon, said local areas having spatial coordinate m and time coordinate n;

generating a response output $\eta_{m,n}(t)$ depending a spatial response function $S_{m,k}$ and a time response function $T_n(t)$, said spatial response function being a Gaussian function centered at said coordinate m;

calculating spatial and time correlation functions $\Gamma_{m,n;m',n'}$ between the response output $\eta_{m,n}(t)$ and $\eta_{m',n'}(t)$;

selecting response outputs of said response output unit in accordance with said spatial and time correlation functions $\Gamma_{m,n;m',n'}$; and detecting a motion direction of said object at coordinate i corresponding to said coordinate m in accordance with a selected output response output for said coordinate i.

* * * * *